Sept. 15, 1970          J. A. BENEKE          3,528,143

CERAMIC EXTRUSION AND CONVEYOR SYSTEM

Filed Aug. 9, 1967          6 Sheets-Sheet 1

INVENTOR
JENE A. BENEKE
Richards, Harris & Hubbard
ATTORNEY

Sept. 15, 1970        J. A. BENEKE        3,528,143

CERAMIC EXTRUSION AND CONVEYOR SYSTEM

Filed Aug. 9, 1967        6 Sheets-Sheet 5

INVENTOR
JENE A. BENEKE

Richards, Harris & Holford
ATTORNEY

United States Patent Office 3,528,143
Patented Sept. 15, 1970

3,528,143
CERAMIC EXTRUSION AND CONVEYOR SYSTEM
Jene A. Beneke, Dallas, Tex., assignor to Verson Manufacturing Company, Dallas, Tex., a corporation of Texas
Filed Aug. 9, 1967, Ser. No. 659,446
Int. Cl. B28b 15/00
U.S. Cl. 25—2
18 Claims

ABSTRACT OF THE DISCLOSURE

Rigid, relatively thin wall liners having flanges at the mouth thereof are moved successively through a charging station where the liners are charged with dry clay and then through forming stations in a pressure forming system. A conveyor loop moves the liners to an extraction station wherein the extruded clay articles are removed, and then the liners are conveyed to a washing station and back to the charging station for reuse in another cycle of operation.

RELATED APPLICATIONS

This application is related to the copending applications Ser. No. 390,264, filed Aug. 13, 1964, now Pat. No. 3,316,606; Ser. No. 509,673, filed Oct. 22, 1965, now Pat. No. 3,374,513; and Ser. No. 568,604, filed July 28, 1966. Additionally, this application is related in part to the disclosure of U.S. Pat. No. 3,285,433.

THE INVENTION

This invention relates to a system for forming under pressure clay articles from extrudable dry clay inside female liners, and more particularly, to a system wherein a conveyor loop cyclically passes female liners through a clay charging system, a pressing station, a greenware extraction station, and a washing station.

THE PRIOR ART

Ceramic ware for use as sanitary articles, such as receptacles and lids for water closets, have generally heretofore been formed by pouring liquid slip into a suitable form. The liquid slip is allowed to dry and harden, after which the hardened article is fired to finally form the article. Such a system requires substantial periods of time to allow the desired hardening of the article, thereby requiring great numbers of forms if the production level is to be substantial. Further, ceramic articles such as flower pots and the like have heretofore been formed using a forming element inside a mold cavity in which a liner is present where the product is symmetrical to the cavity axis permitting rotation of the forming element. Other low pressure systems have heretofore been employed.

It has been found that such ceramic articles may be advantageously formed under extremely high pressures by the utilization of a charge of clay having a water content of the order of 16% to 18%. Such a clay charge is extruded under high pressure in a female liner which has been inserted into a stationary mold. The liner may then be removed from the mold with the product still in the liner and directed to an unloader which will withdraw the formed ceramic article. The present invention is directed to a system which will automatically convey female liners through sequential charging, pressing and extraction stations and then convey the liners through a washing station and back to the charging station for reuse.

SUMMARY

In accordance with the present invention, a conveyor loop is provided for directing movement to female liners from a charging station through forming stations and then back to the charging station. Liner support shuttles are provided in the loop which travel along paths meeting at loop intersections, whereby the support of the female liners may be transferred from one to the other of liner bottoms and the liner tops.

THE DRAWINGS

For a more complete understanding of the present invention and for further objects and advantages thereof, reference may now be had to the following description taken in conjunction with the accompanying drawings in which.

THE PREFERRED EMBODIMENT

Figures 1, 2A, 2B:
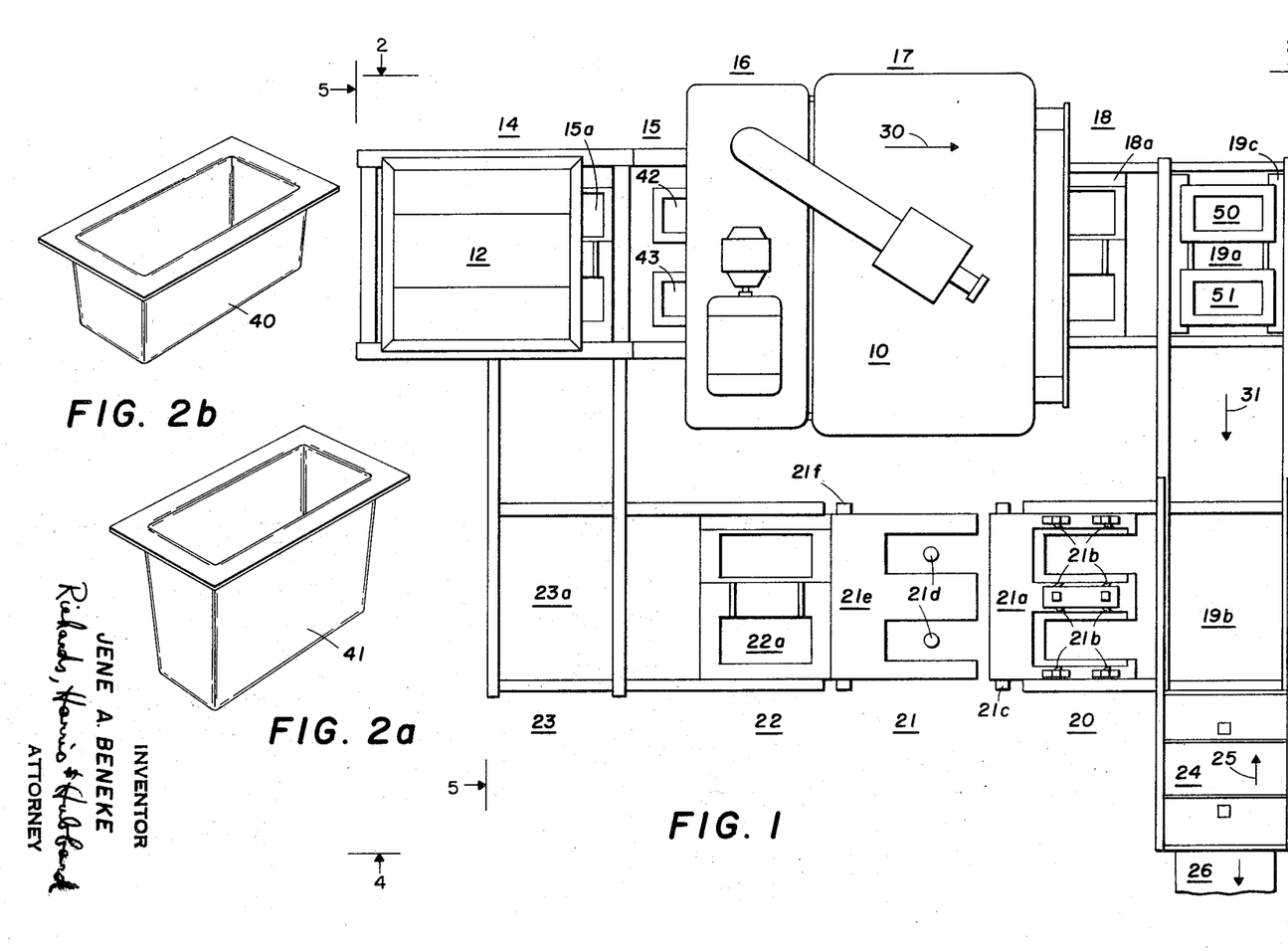
FIG. 1 is a top plan view of a forming press and flow control system.
FIGS. 2A and 2B are perspective views of female liners used in the system of FIG. 1.

In FIG. 1, a hydraulic press 10, as viewed from the top, is positioned in the front side of a conveyor loop. Relatively dry granular clay or pug clay is supplied to a hopper 12 as will be described. Clay from the hopper 12 is placed in measured amounts into successive pairs of female mold liners which are moved beneath hopper 12. The mold liners are continuous walled trays which are adapted to be placed in mold cavities beneath the platen of the press 10 so that the granular clay may be extruded or pressed within the liners to form thin walled article such as water reservoirs and lids for water closets.

In the system illustrated in FIG. 1, the arrangement is such that a water reservoir tank and lid will be simultaneously produced on each stroke of the platen in press 10. The construction and operation of a suitable press 10 illustrated are described in copending application Ser. No. 509,673, filed Oct. 22, 1965.

After the tanks and lids are formed, it is desirable to extract them from the female mold liners and then convey the liners back to the hopper 12 for reuse. The system illustrated in FIG. 1 serves to move liners in steps around a conveyor loop which includes the charging station 14, a press pickup station 15, a de-airing station 16, a pressing station 17, a press output station 18, a cross shuttle station 19, an inshuttle station 20, a washing station 21, an out shuttle station 22, and a cross shuttle station 23.

Briefly, two female liners positioned beneath the hopper 12 are loaded with measured amounts of clay. The liners are then moved on a shuttle 15a from charging station 14 to press pickup station 15. At this point, conveyors associated singularly with the press 10 pick up the liners at station 15, move them beneath the platen in the press 10, and deposit them in a pair of mold cavities at the de-airing station 16. Once the liners are thus deposited in the mold cavities, the platen in press 10 is actuated to force dies into the liners to compress the clay therein and remove air therefrom. Following this operation, as the platen is retracting, the mold liners are picked up from the mold cavities at the de-airing station 16, moved laterally in the direction of arrow 30, and deposited in a second pair of mold cavities at the pressing station 17. As the liners are lowered into the mold cavities of pressing station 17, the platen in press 10 moves to force male dies downwardly into the liners. These male dies fairly closely conform with the inner configuration of the liners so that a thin walled deep tank and lid simultaneously are extruded.

Following the downward stroke of the platen with the mold liners at pressing station 17, the platen is retracted and the liners are lifted from the second mold cavities and deposited on a suitable shuttle 18a at station 18. The mold liners are then moved on the shuttle 18a to cross shuttle station 19a. At this point, an overhead carriage grasps flanges on the upper edges of the liners and moves them in the direction of arrow 31 to an unloading station 19b on the cross shuttle 19. The carriage then deposits the liners on a shuttle. While at this point, an unloader mechanism 24 is moved in the direction of arrow 25 so that it hovers over the liners at the unloading station 19b. The unloading unit 24 then lifts the tank and lid from their respective liners and deposits them on a suitable conveyor 26 leading from the unloading station.

The unloading unit preferably is of the type illustrated and described in U.S. Pat. No. 3,285,433.

After the liners at station 19b are unloaded, the shuttle moves them to station 20 where the liners engage a slotted plate 21a. At this position, clamping means such as the clamps 21b clamp the flanges of the liners to the plate 21a. The plate 21a then is rotated about axis 21c to place the liners upside down over spray nozzles 21d. The clamps 21b are then released and the plate 21a is rotated back to its starting position. Following this, and while a spray of wash fluid is directed onto the insides of the liners, a second plate 21e, rotating about shaft 21f, engages and clamps the liner flanges. After the washing cycle is over, the plate 21e is rotated about shaft 21f to deposit the liners on a shuttle 22a at station 22. Once the liners are released, the shuttle 22a moves the liners to the station 23a of the cross shuttle 23. Shuttle 23 engages the liner flanges to move the liners to the charging station 14 beneath the hopper 12 to initiate another cycle.

Figure 2:
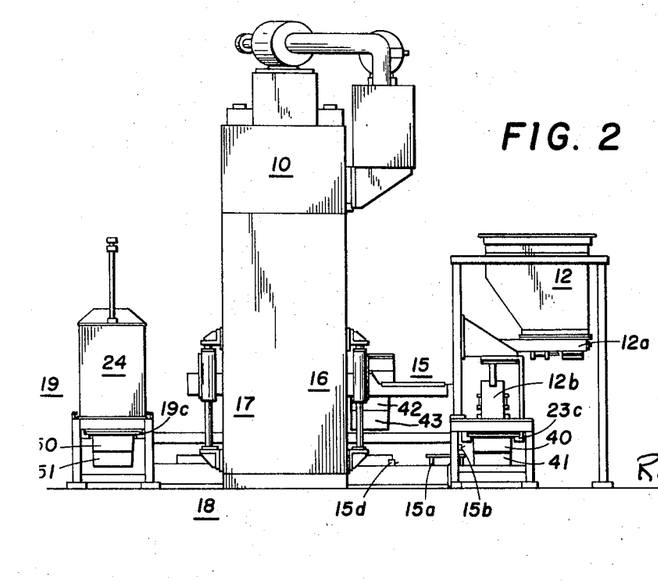
FIG. 2 is an elevation view of the system of FIG. 1 as viewed from lines 2—2 of FIG. 1.

The system as viewed from line 2—2 of the front of the press is illustrated in FIG. 2. The hopper 12 is shown with a feeder 12a which serves to deposit a predetermined amount of clay from the hopper 12 into a dump unit 12b from which the material can be released for deposit in a female liner 40 in which a tank lid will be formed and to load a second liner 41 in which a tank will be formed. Two liners 40 and 41 are shown suspended from the carriage 23c of the cross shuttle 23.

As best shown in FIGS. 2A and 2B, the liners 40 and 41 are relatively thin wall pans having broad flanges at the mouths thereof. The liners are unbroken in their inner surfaces so that they can withstand the high pressure applied during the extrusion of the lid and tank. The walls of the liners are slightly tapered so that they can be inserted into and withdrawn from cavities in the supporting mold which are mounted on the base of the hydraulic press 10 directly beneath the platen.

As shown in FIGS. 1 and 2, a second pair of liners 42 and 43 are supported at the press pickup station 15 on a conveyor which moves the liners through the press in synchronism with the operation of the platen. Third and fourth pairs of liners 44, 45, 46, and 47 (FIG. 7) will be located at the de-airing station 16 within the press. A fifth pair of liners 48 and 49 (FIGS. 3 and 7) are located at the press station 17 within the press 10. A sixth pair of liners 50 and 51 (FIGS. 2 and 3) are supported on a carriage 19c in the cross shuttle 19. From the illustrated position at station 19a, liners 50 and 51 will be moved to the station 19b, where each extruded clay lid and tank 52a and 52b will be extracted therefrom by the unloader 24 and placed on conveyor belt 26.

Figures 3, 4:
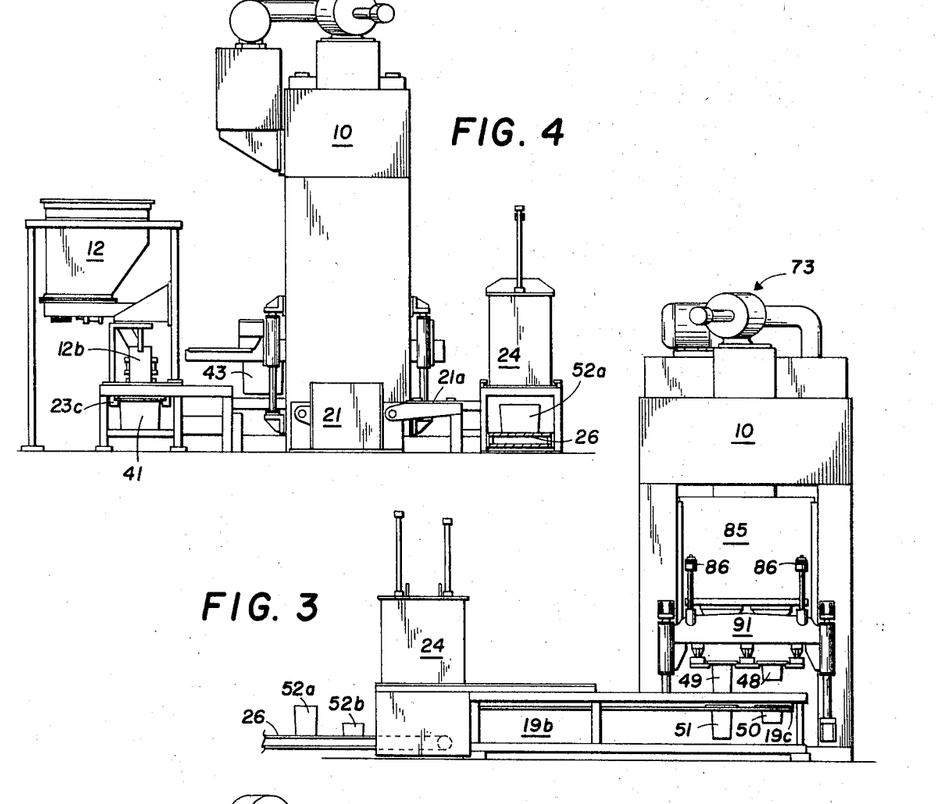
FIG. 3 is a side view of the system of FIG. 1 taken along the lines 3—3 of FIG. 1.
FIG. 4 is a front view taken along the lines 4—4 of FIG. 1.

After the tank and lid are unloaded, the liners are conveyed to the turning plate 21a shown in FIG. 4, which is pivoted to turn the liners upside down at the washing station 21. After washing, the liners are turned upright by the turning plate 21e and deposited on the shuttle 22a, which conveys the liners to carriage 23c of the cross shuttle 23 on which the liners are moved back under the hopper 12 for another cycle. Thus, there are six pairs of female liners in the conveyor loop at all times, with one tank and one lid being completed upon each stroke of the press 10.

Figure 5:
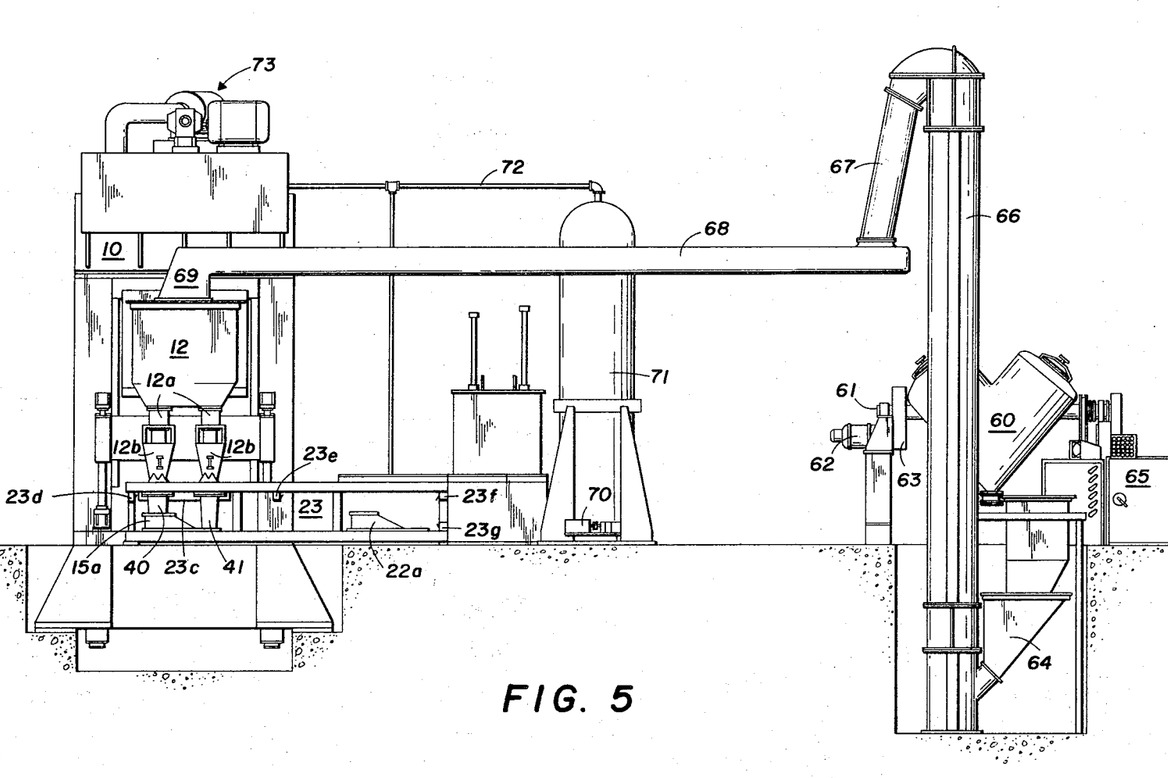
FIG. 5 is a side view taken along the lines 5—5 of FIG. 1, wherein FIG. 5 includes elements for supplying clay to the pressing system.

While only the conveyor loop has been illustrated in FIG. 1, additional structure has been shown in FIG. 5 relating to the preparation and delivery of the clay to the hopper 12. More particularly, the clay constituents in measured proportions are fed from hopper 64 to a V-shaped mixer 60 which is mounted for rotation on shaft 61. The mixer 60 is driven by motor 62 which is coupled to the shaft 61 by the belting unit 63. After the ingredients placed in the mixer 60 are thoroughly mixed, the contents are fed into a bucket conveyor 66 which discharges the clay through chute 67 onto a conveyor 68. The conveyor 68 then conveys the clay to the output 69 above the hopper 12.

Also shown in FIG. 5 is a vacuum pump unit 70 which is operable to evacuate a tank 71. The tank 71 is connected by way of line 72 to the press 10 so that during the de-airing operation at station 16 a vacuum may be applied to the mold liners to remove substantially all of the air from the clay charge therein.

Press 10 is operated by hydraulic power supplied by a conventional hydraulic motor and pump system 73.

The foregoing description has dealt with the general operation of the present system. Specific structural aspects of the system and its operation will now be described.

CHARGING STATION

Figure 6:
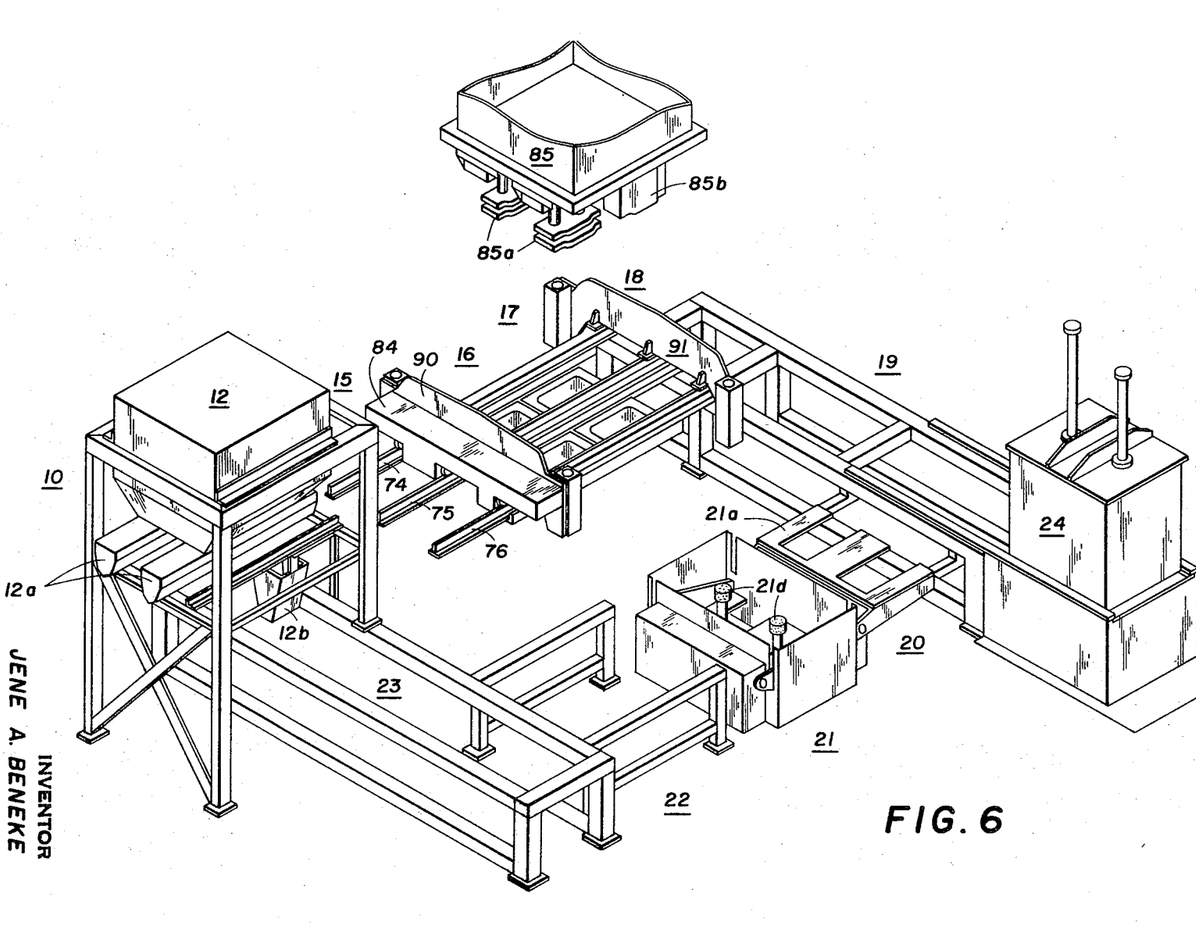
FIG. 6 is a fragmentary perspective view of the system of FIGS. 1–5.

FIG. 6 illustrates a pair of vibrating feeders 12a connected to dump unit 12b having dump doors operated by solenoid valve controlled air cylinders (not shown). Such solenoid valves are actuated each time a pair of female liners are stationed beneath hopper 12. Providing the dump units 12b are properly charged with the correct amount of clay, female liners 40 and 41 (FIGS. 2 and 5) are moved underneath the units by the carriage 23c.

A limit switch 23d (FIG. 5) senses the presence of the carriage to actuate a solenoid valve (not shown) to move the in shuttle 15a underneath the liners. Shuttle 15a includes a split level support platform in order to support the deep tank and the shallow lid liners with the top flanges in the same place. As will be later described in detail, the shuttle 15a also includes a lifting mechanism to raise the support platform to engage and left the bottoms of the liners. This will cause the flanges of the liners to be lifted from the carriage 23c. A limit switch 15b (FIG. 2) senses the upward movement of the liners 40 and 41 to energize a solenoid (not shown) and cause the carriage 23c to be retracted in the cross shuttle station 23, thus freeing the liners for movement on in shuttle 15a. A limit switch 23e (FIG. 5) senses the arrival of carriage 23c at a central position in its course to signal solenoid valve-operated air cylinders of hopper 12 to charge the liners 40 and 41 with clay. Vibrator motors (not shown) will be energized to charge the dump units with the next correct amount of clay.

After the liners 40 and 41 are charged, the shuttle 15a is lowered and the drive for the shuttle 15a is energized to move the liners to the input station 15. A limit switch 15d senses arrival of shuttle 15a at station 15.

DE-AIRING AND PRESSING STATION

Figure 7:
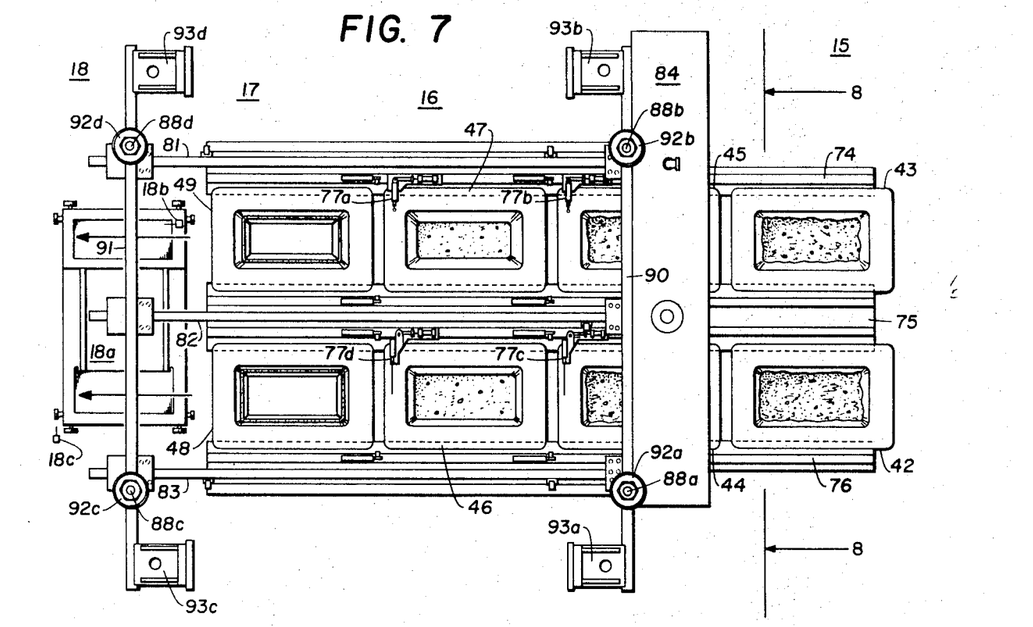
FIG. 7 is a detailed top view of the forming press shown in FIG. 1.
Figure 8:
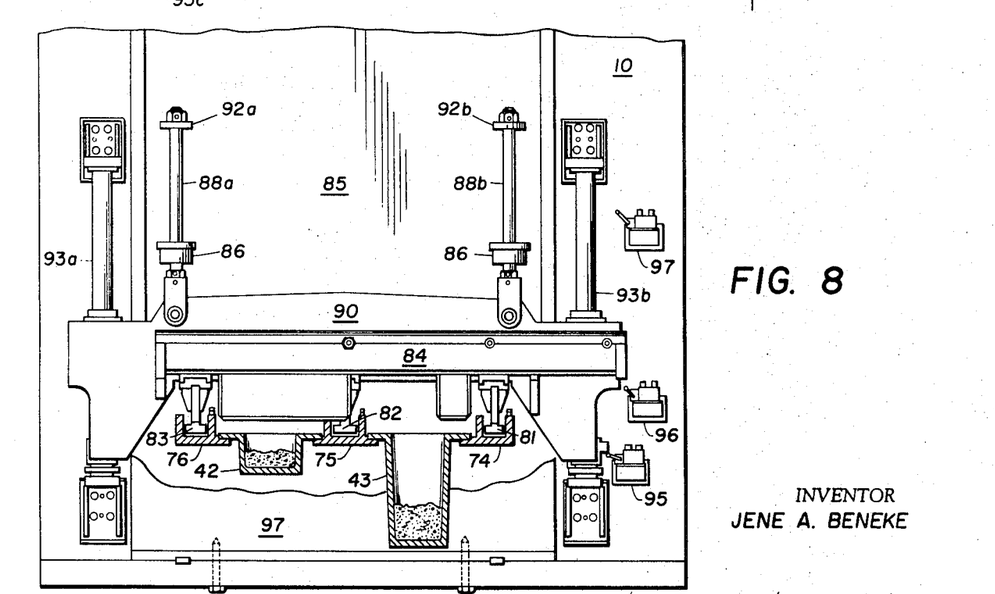
FIG. 8 is a front view of the forming press taken along lines 8—8 of FIG. 7.

FIGS. 7 and 8 show the pair of female liners 42 and 43 which have lifted from the shuttle 15a by three parallel sliding feed rails 74, 75 and 76, for movement through the de-airing and pressing stations 16 and 17. The feed rails are adapted to move the liners both vertically and horizontally from one station to the next. Limit switches 77a–77d are connected to detect the presence of liners at the intermediate stations. The feed rails 74–76 are carried by fixed hangers 81, 82 and 83 and the rails are alternatively extended and retracted horizontally along the fixed hangers by suitable rack and pinion members driven by a hydraulic system located in the gear box 84.

The feed rails are vertically movable because they are supported from the platen 85 which is alternatively raised (FIG. 3) and lowered (FIG. 8) by the hydraulic ram system 73. More particularly, pairs of lifting lugs 86 are rigidly connected to opposite sides of the platen 85 and slidable receiver rods 88a–88d. The rods 88a and 88b rigidly extend from a follower 90 on the input side of press 10. Similarly, rods 88c and 88d extend from the follower 91 on the output side. Rods 88a–d include stops 92a–d for engaging lugs 86 when platen 85 is raised. The follower 90 is slidably mounted on guide posts 93a–b which are fixed to the main structure of the press 10. Follower 91 is slidably mounted on guide posts 93c–d. The followers 90 and 91 support the ends of hangers 81, 82, and 83 along which the feed rails 74, 75, and 76 are horizontally driven.

Limit switches 95, 96, and 97 sense the vertical position of the platen 85 and the follower 90 in order to selectively actuate desired operations of the de-airing and pressing station.

FIG. 8 shows the female liners 42 and 43 with the charges of clay loosely disposed therein, and the platen in its lower position in order to receive the liners. In the lowered position of the platen 85, the liners in the de-air and pressing stations are disposed in the mold base 97.

In operation, when limit switch 15d (FIG. 2) is actuated, the platen 85 is lifted causing the lugs 86 to contact the stops 92a–d. Further upward movement of the platen 85 will then raise the followers 90 and 91 upwardly along the shafts 93a–d, thereby lifting the female liners 42 and 43 by the flanges from the support platform of the shuttle 15a. When the followers 90 and 91 reach the limit of upward travel, limit switch 97 will be actuated, causing a hydraulic motor in the gear box 84 to horizontally drive the bars 74, 75, and 76 forward to advance the female liners one station. The limit switches 77a–d sense the advance of one station of the feeding mechanism, thereby causing platen 85 to be lowered. The followers 90 and 91 slide downwardly along shafts 93a–d until the female liners are nested in the mold at a station ahead of the de-airing station 16, and shown occupied by liners 44 and 45 in FIG. 7. In its lowered position, follower 90 actuates limit switch 95, which causes the feed rails 74, 75, and 76 to be horizontally retracted to their position shown in FIG. 7, in order to receive a new set of female liners at station 15. The platen 85 will then be at a point shown in FIG. 6, with dies 85a and 85b above the female liners in stations 16 and 17. The platen 85 continues its travel downwardly to force the dies 85a and 85b into the liners at stations 16 and 17.

On the next cycle of the press 10, the liners are picked up by the feed rails 74, 75, and 76, and moved horizontally to station 16 and lowered into a cavity in the mold base 97 shown occupied by liners 46 and 47 in FIG. 7. The platen 85 continues its downward travel until the dies 85a (FIG. 6) seal off the tops of the female liners. The de-airing process preferably will be carried out in accordance with the method and system disclosed in the previously mentioned copending applications. Ser. No. 390,264, filed Aug. 13, 1964, and Ser. No. 568,604, filed July 28, 1966. Briefly described, as the dies approach the lower extremity of the traverse into the liners, a valve is automatically opened which is connected to the line 72 (FIG. 5) whereby vacuum is applied to the space beneath the lid in the interior of the liner to assist in expelling air from the clay body as a de-airing die compacts the granular charge into a compact clay body in the bottom of each liner.

After the clay in the liners at de-airing station 16 is suitably compressed, platen 85 moves up, thereby lifting the liners up from the mold base 97. Feed rails 74, 75, and 76 horizontally move the liners over the molds to the pressing station 17 and platen 85 lowers the liners into the molds, shown occupied in FIG. 7 by liners 48 and 49. Dies 85b are then forced into the liners, causing the clay to be extruded between the inside walls of the liners and the outside walls of the dies to form the desired thin wall tank and lid. FIG. 7 illustrates the pair of liners 48 and 49 after having the clay therein extruded. As described more fully in the copending applications above noted, dies 85b preferably are heated by suitable electric heaters (not shown) and are sprayed with lubricant to allow the dies to be retracted from the liners without damage to the formed articles.

After the liners at station 17 are pressed, platen 85 again cycles up and rails 74, 75, and 76 move the liners to the press output station 18. As shown in FIG. 7, an out shuttle 18a is positioned at this station for receiving the liners. Shuttle 18a is similar to shuttle 15a, having a split level support platform for supporting the mouths of both the deep tank and shallow lid liners at the same level. A limit switch 18b is positioned on the tank side of the support platform for sensing deposit of the liners onto the shuttle as the platen 85 moves downward. Actuation of the limit switch 18b causes a hydraulic motor (not shown) to move the shuttle from station 18 to the cross shuttle station 19a. On the way to station 18, the shuttle 18a actuates a limit switch 18c which causes the shuttle to be raised.

CROSS SHUTTLE 19

Figures 9, 10, 11, 12:
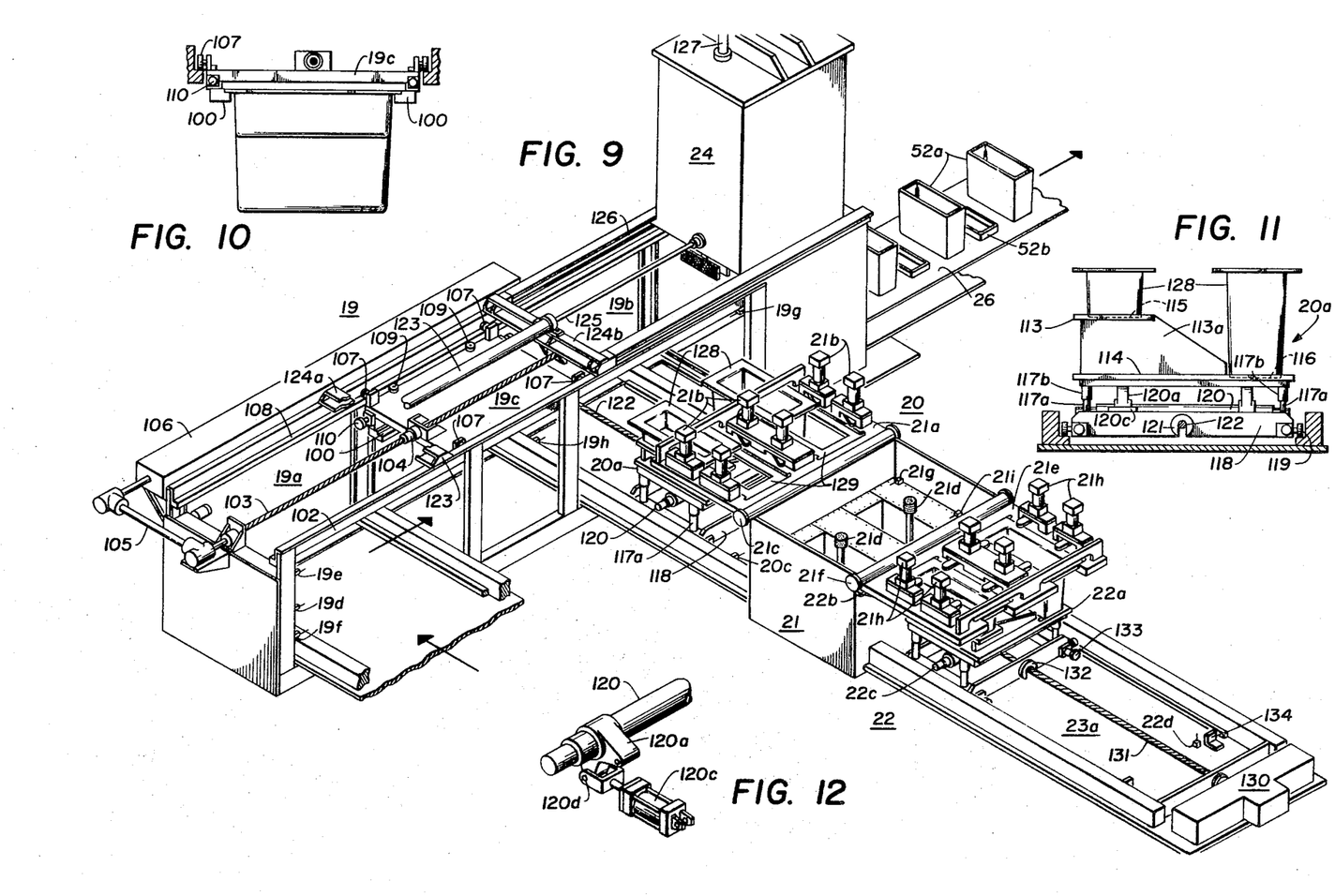
FIG. 9 is a perspective view of a portion of the flow control system of FIGS. 1–5.
FIGS. 10–12 are somewhat schematic views of shuttles used in the system of FIGS. 1–5 for transporting female liners.

A limit switch 19d (FIG. 9) senses the presence of shuttle 18a at station 19c and causes the shuttle carriage 19c to be driven to station 19a over the top of the female liners. Carriage 19c includes supporting extensions 100 which extend from the bottom edges thereof, and which are adapted to slide under the top flanges of the female liners, as seen in FIG. 10. Extensions 100 include grooved portions 100a for securely receiving the liners. When the carriage 19c is centered over the female liners, a limit switch 19e will be actuated, thereby energizing suitable solenoids (not shown) to cause the shuttle 18a to be lowered thereby transferring support from the bottom of the female liners to the upper flanges of the liners. When shuttle 18a reaches its lowered position, limit switch 19f will be actuated to energize a suitable solenoid to drive the shuttle 18a back to the press output station 18 to receive another pair of female liners on the next stroke of press 10.

As shown in FIG. 9, the cross shuttle carriage 19c is selectively moved across a rigid shuttle framework 102 by a threaded screw 103 which is threadedly received by a nut 104 connected to the upper part of the carriage 19c. The threaded screw 103 is driven through two right angle gear couplings from a suitable hydraulic driving means located in the gear box 106. The carriage 19c includes rollers 107 which roll along a supporting flange 108 along the rigid support 102. The carriage 19c also includes rollers 109 which roll along edges of the flanges 108 in order to prevent lateral wedging of the carriage.

In operation, the hydraulic motor in the gear box 106 is actuated in response to the lowering of the shuttle 18a by a limit switch to cause rotation of the threaded screw 103. The follower nut 104 will move along the threaded screw 103 to move the carriage 19c in the direction of the station 19b. Arrival of the carriage 19c at station 19b is detected by the limit switch 19g to stop carriage 19c and to energize suitable solenoids to drive the in shuttle 20a to station 19b underneath the suspended female liners. When the shuttel 20a is properly positioned underneath the female liners, a limit switch 19h will be actuated to energize a suitable solenoid valve to raise the shuttle 20a upwardly in order to engage and lift up the bottoms of the female liners. The flanges of the female liners will be disengaged from the support portions 100 of the carriage 19c, and the support of the female liners will be transferred from the upper flanges to the bottom of the liners. Carriage 19c is then retracted.

The shuttle 20a is similar to the shuttles previously described, and has a split level support in order to carry the liners so that the flanges are at the same level.

A more detailed view of the shuttle 20a is illustrated in FIG. 11, wherein an upper support portion 133, resting on spaced apart walls 113a, supports the bottom of a lid liner and the lower support portion 114 supports the bottom of a tank liner. The support portions include indentations 115 and 116 in order to nest the liner bottoms. Four legs 117a are slidably mounted in sleeves 117b to provide vertically extensible support from a base 118 which rolls along rails on rollers 119. A shaft 120 is rotatably mounted under base 114 and includes cams 120a and 120b which bear on base 114. The shaft may be rotated by actuation of solenoid 120c in order to raise the support upwardly by virtue of a camming action by cams 120a and 120b. Legs 117 are vertically extended by this movement.

FIG. 12 shows the coupling from solenoid 120c to a projecting lug on the shaft 120 at a pivot 120d in order to cause rotation of the shaft to lift the liner supports.

A follower nut 12, FIG. 11, receives a threaded screw 122 which may be selectively rotated by a motor (not shown) located in a remotely disposed gear box. In operation, suitable limit switches sense when the female liners are removed from engagement with the carriage 19c by the raising of the shuttle 20a. Carriage 19c is then moved out of registration with the flanges of the liners to the neutral station shown in FIG. 9 to be ready for another cycle of operation.

GREENWARE EXTRACTOR

The greenware extractor 24, which is preferably of the type disclosed in U.S. Pat. No. 3,285,433, is adapted to be selectively moved over the unloading station 19b by means of actuation of hydraulic cylinder 123. Clinder 123 is connected at the ends thereof to brackets 124a and 125b to the framework 102. A piston rod 125 is connected to the unloading station 24 so that actuation of the hydraulic cylinder 123 causes the extractor 24 to be selectively moved along tracks 126.

In operation, when the female liners containing the extruded clay articles are positioned on the shuttle 20a at station 19b, the hydraulic cylinder 123 will be actuated to move the extractor 24 directly over the female liners. The hydraulic cylinders 127 will be actuated to move the extractor mechanism (not shown) downwardly into the liners. The lid extractor will extract the extruded lid greenware out of the lid female liner. As more fully disclosed in U.S. Pat. No. 3,285,433, the extractor mechanism will remove the tank greenware by means of a vacuum seal plate which is driven laterally to meet and seal off the greenware walls. The vacuum is created to clamp rubber friction pads on the sides of the tank greenware, and then both the lid and tank extractor mechanisms are raised to life the greenware out of the female liners.

When the extractor mechanisms reach their top positions, the greenware will contact limit switches inside the extractor housing 24. The hydraulic cylinder 123 will then be actuated to move the extractor station 24 to the location shown in FIG. 9. The extractor mechanisms will lower the greenware onto the conveyor belt 26 and will release the greenware to be conveyed to further processing stations.

LINER WASHING STATION

After the greenware has been extracted from the female liners, a solenoid valve is energized to cause rotation of the threaded screw 122 to move the shuttle 20a to the in shuttle station 20. FIG. 9 shows the shuttle 20a in an intermediate position between stations 19b and 20, with female liners 128 being shown for purposes of illustration slidingly received by the turnover plate 21a. The plate 21a includes grooved portions 129 of configuration to mate with the flanges of the female liners to position the same. The clamps 21b, previously described, are in their retracted position during the insertion of the female liners.

When the shuttle 20a is properly positioned at station 20, the limit switch 20c will be actuated to signal the solenoid valve 120c to lower the shuttle 20a through rotation of the shaft 120. The flanges of the female liners 128 will be lowered into the grooved portions 129 and supported thereby. The lowering of the shuttle 20a is sensed by suitable limit switches in order to prepare the shuttle 20a for the next cycle of operation.

The presence of the female liners 128 in the grooved portions is sensed by suitable limit switches (not shown) in order to energize the clamps 21b tightly to clamp the flanges of the liners to the turnover plate 21a. As soon as the liners are suitably clamped, a drive cylinder will be energized by a solenoid valve (not shown) in order to rotate the plate 21a through 180° to deposit the liners 128 in an inverted position over the spray nozzles 21d. Limit switch 21g senses the arrival of the females in the washing station 21 to release the clamps 21b. With the females unclamped, the empty turnover plate 21a returns to the position shown in FIG. 9 to receive the next set of female liners.

The return of turnover plate 21a to its empty position will be sensed by suitable limit switches in order to actuate a drive cylinder for the second turnover plate 21e in order to rotate the plate 180° about pivot point 21f to a position inside the washing tank 21 over the female liners. A limit switch 21i senses the second turnover plate 21e to energize the clamping cylinders 21h to clamp the flanges of the liners. Suitable limit switches connected to the cylinders 21h will signal mechanism at the wash station 21 to energize a pump motor to spray washing liquid through the spray nozzles 21d. This spray rinses the insides of the female liners to prepare them for another extruding cycle.

At the end of a predetermined time interval, the pump motor of the washing station 21 will be de-energized. After a short time delay, a solenoid valve is energized to actuate the hydraulic cylinder for the turnover plate 21e in order to rotate the plate 21e to the position shown in FIG. 9, thereby placing the female liners in an upright position on the out shuttle 22a.

Upon rotation of the plate 21e to out shuttle station 22, a limit switch 22b is actuated to release the clamps 21h from the flanges of the female liners. Limit switches in the clamp cylinders 21h will be then actuated to signal a suitable solenoid valve (not shown) in order to rotate the shaft 22c. Cams on shaft 22c will raise the support platform of the shuttle 22a in the manner previously described. The female liners will thus be lifted out of the grooved portions provided in the turnover plate 21e, a condition sensed by limit switches (not shown) located on the plate 21e. These limit switches will energize a hydraulic drive motor located in the gear box 130 to rotate the threaded screw 131. The nut 132 will ride down screw 131 to pull the shuttle 22a to the transfer station 23a. Stops 133 abut uprights 134 to properly position the shuttle. When the shuttle 22a reaches station 23a, a limit switch 22d is actuated to cause the cross shuttle 23c to be moved from its neutral position at station 23 (FIG. 5) to station 23a.

The support flanges underneath the cross shuttle carriage 23c will slide under the flanges on the female liners, in the same manner as shown in FIG. 10. When the cross shuttle carriage 23c is properly positioned over the female liners, the limit switch 23f (FIG. 5) will be actuated to cause the shuttle 22a to be lowered. The lowering of the shuttle 22a will be sensed by the limit switch 23g to cause the shuttle 22a to be returned to the position at station 22 shown in FIG. 9. The lowering of the shuttle 22a will deposit the female liners on the cross shuttle carriage 23c, and the carriage 23c will then be moved to the charging station 14 in the manner previously described in order to initiate a new cycle of operations utilizing the female liners.

It will thus be understood that the present system utilizes six pairs of female liners at all times, with four liners being generally positioned in the vicinity of the press station 10 and the remaining two liners being cycled through the remaining portion of the conveyor loop. The system constructed in accordance with the present invention is fully automatic, and may produce large numbers of extruded ceramic articles of high quality without substantial manpower requirements.

Additionally, safety mechanisms may be provided on the present system in combination with the various limit switches and solenoids sensing the position of the liners about the conveyor loop, in order to indicate any malfunction of the system. For instance, suitable controls may be provided to indicate the absence of a liner at a station at a designated time in order to energize suitable warning lights or sound generators. Additionally, similar indication mechanisms could be energized if the ceramic articles produced were broken or punctured.

Whereas the present specification has been described in considerable detail with respect to a prefered embodiment, it is to be understood that this description is for purposes of illustration, and changes or variations in the described embodiment may be made by persons skilled in the art without departing from the true scope and spirit of this invention, as is solely defined in the appended claims.

What is claimed is:

1. In a system wherein female liners having a flange at the mouth thereof for high pressure molds are charged with extrudable dry clay and are to be moved through a stationary pressing station to form a clay body, the combination which comprises:
    (a) a conveyor loop having a plurality of sides for directing movement to said liners from the output of said stationary pressing station to a plurality of intermediate stations and thence to a charging station adjacent to the input to said pressing station,
    (b) conveyor means in said loop including liner support shuttles including means to engage said flanges which travel along paths which meet at loop intersections with support shuttles which support said liners at the bottom thereof, and
    (c) means operable at each said intersection for transferring said liners from one shuttle to another, shuttle support for said liners being transferred at each intersection from one to the other of the liner bottom and liner top.

2. The combination set forth in claim 1 wherein the shuttles which support said liners from the liner tops move rectilinearly only and wherein the shuttles which support said liners from the liner bottoms move rectilinearly and include means operable at each extremity at the traverse of the shuttles for raising and lowering thereof.

3. The combination set forth in claim 2 and further comprising:
    two shuttles for supporting said liners from the liner top located on two opposite sides of said conveyor loop and adapted to move said liners in opposite directions, and
    two pairs of shuttles for supporting said liners from the bottom located on the other two opposite sides of said conveyor loop.

4. The system according to claim 2 wherein pairs of said female liners having different depths to form mating tanks and lids are concurrently moved through said stations in side-by-side relationships, the liner tops of said liners remaining in substantially the same plane throughout movement through said conveyor loop.

5. The system according to claim 2 wherein said means for raising and lowering said shuttles comprises:
    support surfaces for supporting the bottoms of said liners,
    cam means pivotally mounted beneath and engaging said support surfaces, and
    means operable to rotate said cam means to selectively lift or lower said support surfaces.

6. The system according to claim 2 wherein said shuttles which support said liners from the liner tops include spaced apart lips adapted to fit under portions of liner tops and having rollers adapted to travel along elongated tracks disposed along said paths.

7. The system of claim 2 wherein said shuttles comprise:
    support surfaces having roller means mounted for movement on parallel rails spaced along said paths and further having nut means fixedly attached thereto,
    a threaded shaft passing through said fixed nut means, and
    driving means connected to said threaded shaft for rotating said shaft to move said shuttles along said paths.

8. The system of claim 7 wherein said shuttles for supporting said liners from the liner tops comprise a pair of support platforms of different vertical heights for conveying at the same level the tops of different sized liners.

9. In a system where a measured amount of substantially dry clay is to be loaded into a female mold liner for forming a tank under pressure in a forming system, the combination which comprises:
    (a) a measuring feed hopper above a loading station,
    (b) a movable shuttle having a platform adapted to be positioned at one end of the shuttle traverse directly beneath said hopper,
    (c) a carriage having means to support said liner near its mouth and movable to position said liner above said platform at said loading station,
    (d) means activated upon arrival of said carriage at said loading station for elevating said platform to lift said liner free of said carriage,
    (e) means responsive to elevation of said liner from said carriage to retract said carriage from said loading station,
    (f) means responsive to retraction of said carriage from said loading station for activating said hopper to deliver a measured amount of said clay to said liner, and
    (g) means operable following said delivery of said clay to lower said liner and to propel said shuttle from said loading station to the input of said forming system while in the lowered position.

10. The combination set forth in claim 9 wherein a conveyor system forms a closed rectangular loop around said feed hopper and wherein shuttles providing bottom support for said liners move said liners along traverses confined to two opposite sides of said loop and wherein shuttles engaging feed liners near the mouths thereof move said liners along the traverse exclusively limited to the other two sides of the loop.

11. In a system where a rigid relatively thin wall, unbroken liner having a flange at the mouth thereof is moved successively through forming stations in a pressure forming system, a conveyor loop for movement of the liner from and to the forming stations, which comprises:
- (a) a first out shuttle platform adapted to receive said liner from a forming output station and having means for conveying the same along a first traverse and lifting said liner at the end of said first traverse,
- (b) a first cross shuttle having a carriage movable to intersect the path of said first out shuttle platform and having support structure which moves under the flange of said liner, and
- (c) means responsive to registration of said support structure with said flanges to deposit said liner onto said support structure for movement with said carriage along a second traverse.

12. The system according to claim 11 and further comprising:
a first in shuttle platform adapted to be moved to intersect said second traverse under said carriage and having elevator means for engaging and lifting said liner from said support structure, and
means responsive to the retraction of said carriage from over said platform for conveying said liner along a third traverse.

13. The system according to claim 11 wherein said forming station includes feed rails for supporting said flange of said liner and for successively moving said liner successively vertically and horizontally through said forming stations, said rails in one position depositing said liner on said first out shuttle platform.

14. In a system where a rigid relatively thin wall liner having a flange at the mouth thereof is moved successively from clay extruding stations to an extruded article extraction system, a conveyor for movement of the liner to and from the extraction station which comprises:
- (a) a first cross shuttle having a carriage movable along a rectilinear path and having support structure which supports the flange of said liner to carry said liner to the input of said extraction station,
- (b) a first in shuttle platform adapted to be moved to intersect the traverse of said carriage and having elevator means for engaging the liner bottom and lifting said liner from said support structure,
- (c) extraction means responsive to the retraction of said carriage for extending into said liner and removing the extruded article therefrom, and
- (d) means responsive to the extraction of the extruded article from said liner to convey said first in shuttle platform along a rectilinear traverse.

15. In a system wherein a rigid relatively thin wall liner having a flange at the mouth thereof is moved successively through clay extruding and article extraction stations, a conveyor for movement of the liner from the extraction station to the extruding station which comprises:
- (a) a first in shuttle platform adapted to convey said liner along a rectilinear traverse from the output of said article extraction station,
- (b) a treating station having means for lifting said liner by the flange thereof from said first in shuttle platform and depositing said liner upside down in a treating chamber,
- (c) said treating station further having means for clamping said flange of said liner after the treatment thereof and rotating said liner out of said treating chamber to an upright position on an output station.

16. The system according to claim 15 wherein said treating station comprises:
an open-ended treating chamber having means for spraying liquid therein,
a first platform pivotally mounted to one side of said chamber and movable about a 180° arc into and out of said chamber,
a second platform pivotally mounted to a side opposite said first platform and adapted to pivot about a 180° arc into and out of said chamber,
both of said platforms having cutout portions adapted to receive said liner, and
clamp means attached to each of said platforms for selectively gripping the flange of said liner.

17. The system according to claim 15 and further comprising:
an out shuttle platform having elevator means for lifting said platform into engagement with the bottom of said liner at said output station and movable to convey said liner from said output station along a rectilinear traverse,
a cross shuttle having a carriage movable to intersect said rectilinear traverse and having a support structure which moves under the flange of said liner, and
means responsive to registration of said support structure of said cross shuttle with said flanges to deposit said liner onto said support structure for movement along a rectilinear traverse.

18. The system according to claim 17 and further comprising:
a second in shuttle platform adapted to move from and to the input of said extruding station and having elevator means for engaging and lifting said liner from said cross shuttle when in substantial registration therewith and while elevated conveying said liner along a rectilinear traverse leading to the input of said extruding stations.

References Cited
UNITED STATES PATENTS

| | | | |
|---|---|---|---|
| 3,189,971 | 6/1965 | Derror | 25—2 X |
| 3,285,433 | 11/1966 | Beneke | 294—65 X |
| 3,316,606 | 5/1967 | Kelleher | 25—22 |

J. SPENCER OVERHOLSER, Primary Examiner

U.S. Cl. X.R.

25—27, 103

PO-1050
(5/69)

UNITED STATES PATENT OFFICE
CERTIFICATE OF CORRECTION

Patent No. 3,528,143        Dated Sept. 15, 1970

Inventor(s)    J. A. Beneke

It is certified that error appears in the above-identified patent and that said Letters Patent are hereby corrected as shown below:

Col. 1, line 28, after "1966" insert --, now abandoned.--.

Col. 2, line 50, "article" should be --articles--.

Col. 4, line 47, "unit" should be --units--;

line 61, "left" should be --lift--.

Col. 5, line 75, after "applications" delete the period (.).

Col. 6, line 70, "flanges" should be --flange--.

Col. 7, line 6, "shuttel" should be --shuttle--;

line 50, "clinder" should be --cylinder--;

line 70, "life" should be --lift--.

SIGNED AND
SEALED
DEC 1 1970

(SEAL)
Attest:

Edward M. Fletcher, Jr.
Attesting Officer

WILLIAM E. SCHUYLER, JR.
Commissioner of Patents